US012581232B2

(12) United States Patent
Oizumi

(10) Patent No.: US 12,581,232 B2
(45) Date of Patent: Mar. 17, 2026

(54) SOUND COLLECTION CONTROL METHOD AND SOUND COLLECTION APPARATUS

(71) Applicant: YAMAHA CORPORATION, Hamamatsu (JP)

(72) Inventor: Yoshifumi Oizumi, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 97 days.

(21) Appl. No.: 18/366,078

(22) Filed: Aug. 7, 2023

(65) Prior Publication Data

US 2024/0073596 A1　Feb. 29, 2024

(30) Foreign Application Priority Data

Aug. 26, 2022　(JP) ................................. 2022-134670

(51) Int. Cl.
　H04R 1/40　　　(2006.01)
　G06T 7/70　　　(2017.01)
(52) U.S. Cl.
　CPC .............. H04R 1/403 (2013.01); G06T 7/70 (2017.01); H04R 1/406 (2013.01); G06T 2207/20081 (2013.01)
(58) Field of Classification Search
　None
　See application file for complete search history.

(56) References Cited

U.S. PATENT DOCUMENTS

| | | | |
|---|---|---|---|
| 5,940,118 A | 8/1999 | Van Schyndel | |
| 10,341,784 B2 * | 7/2019 | Recker ................. | H04R 25/407 |
| 10,499,164 B2 * | 12/2019 | Li ........................... | H04R 25/40 |
| 11,172,122 B2 * | 11/2021 | Welbourne ........... | H04N 23/611 |
| 11,321,866 B2 * | 5/2022 | Kim ......................... | G06F 18/21 |
| 11,375,309 B2 * | 6/2022 | Hirose ................... | H04R 3/005 |
| 11,778,368 B2 * | 10/2023 | Veselinovic .......... | H04R 1/326 381/92 |
| 12,010,490 B1 * | 6/2024 | Delikaris Manias ... | H04S 7/303 |
| 12,288,566 B1 * | 4/2025 | Ganguly ................. | G10L 25/51 |
| 2015/0022636 A1 * | 1/2015 | Savransky ............... | H04R 3/00 348/46 |
| 2020/0265860 A1 * | 8/2020 | Mouncer .................. | H04R 5/04 |
| 2021/0120333 A1 * | 4/2021 | Hirose ..................... | H04R 1/40 |
| 2024/0296821 A1 * | 9/2024 | Joshi ...................... | H04R 3/005 |

FOREIGN PATENT DOCUMENTS

JP　　　　2021197658 A　　12/2021

OTHER PUBLICATIONS

Extended European Search Report issued in European Appln. No. 23193180.9, mailed Jan. 17, 2024.
Communication Pursuant to Article 94(3) EPC issued in European Appln. No. 23 193 180.9 mailed Nov. 14, 2025.

* cited by examiner

*Primary Examiner* — Paul W Huber
(74) *Attorney, Agent, or Firm* — ROSSI, KIMMS & McDOWELL LLP

(57)　　　　ABSTRACT

A sound collection control method recognizes a speaker from an image, detects a position of the recognized speaker, sets a first collection beam based on the position of the recognized speaker, recognizes a specific object other than the recognized speaker from an image, detects a position of the recognized specific object, and sets a second collection beam based on the detected position of the recognized specific object.

14 Claims, 17 Drawing Sheets

FIG.5

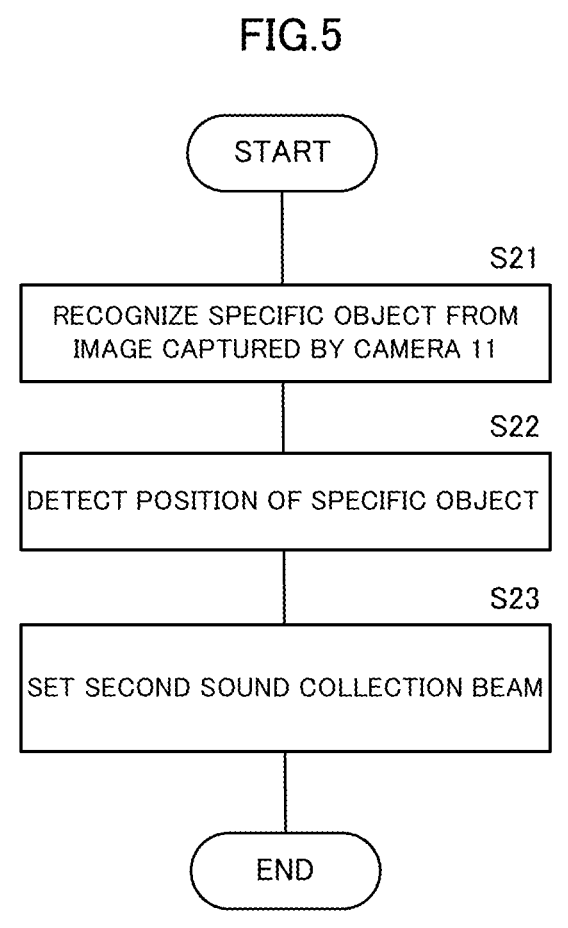

START

S21

RECOGNIZE SPECIFIC OBJECT FROM
IMAGE CAPTURED BY CAMERA 11

S22

DETECT POSITION OF SPECIFIC OBJECT

S23

SET SECOND SOUND COLLECTION BEAM

END

SOUND COLLECTION CONTROL METHOD AND SOUND COLLECTION APPARATUS

CROSS REFERENCE TO RELATED APPLICATIONS

This Nonprovisional application claims priority under 35 U.S.C. § 119(a) on Patent Application No. 2022-134670 filed in Japan on Aug. 26, 2022, the entire contents of which are hereby incorporated by reference.

BACKGROUND

Technical Field

An embodiment of the present disclosure relates to a sound collection control method and a sound collection apparatus.

Background Information

Japanese Unexamined Patent Application Publication No. 2021-197658 discloses a sound collection apparatus that detects a line-of-sight direction in first image data to be inputted from an input unit and controls a sound collection direction on the basis of a detection result of the line-of-sight direction and correspondence information. The sound collection apparatus of Japanese Unexamined Patent Application Publication No. 2021-197658 discloses a dynamic beam that changes a direction of a sound collection beam according to a line of sight.

A user may desire to set to keep a sound collection beam pointed at a specific person in order to reliably deliver voice of an important speaker (an executive, for example) to an opposite communication party.

SUMMARY

An embodiment of the present disclosure is directed to provide a sound collection control method capable of easily performing setting to keep a sound collection beam pointed at a specific person, while using a dynamic beam.

A sound collection control method according to an embodiment of the present disclosure recognizes a speaker, detects a position of the speaker, sets a first sound collection beam, based on the position of the speaker, recognizes a specific object other than the speaker, detects a position of the specific object, and sets a second sound collection beam, based on the position of the specific object.

According to an embodiment of the present disclosure, setting to keep a sound collection beam pointed at a specific person are easily performed while a dynamic beam is used.

BRIEF DESCRIPTION OF THE DRAWINGS

FIG. 5 is a flowchart showing another operation of the recognizer 100, the position detector 110, and the sound collection beam setter 120.

DETAILED DESCRIPTION

Figure 1:
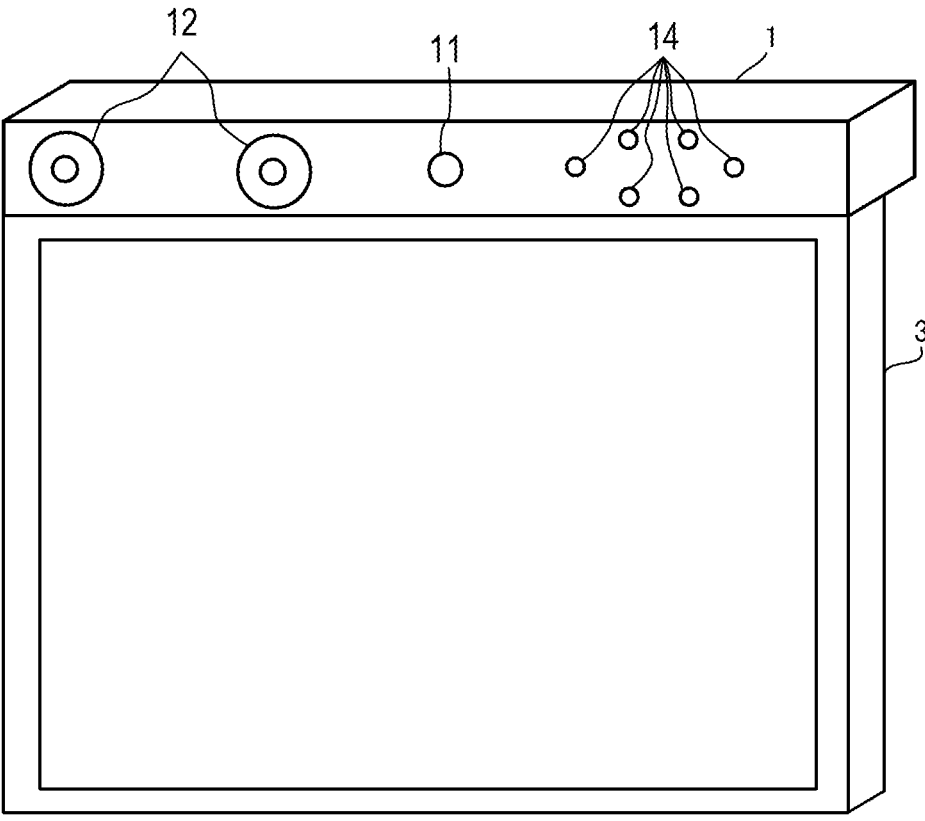
FIG. 1 is an external perspective view of a sound collection apparatus 1 and a display 3.

FIG. 1 is an external perspective view of a sound collection apparatus 1 and a display 3. The sound collection apparatus 1 includes a housing with a rectangular parallelepiped shape that is long in a width direction. The housing of the sound collection apparatus 1 is placed on the top surface of the display 3 as an example. The sound collection apparatus 1 includes a camera 11, a plurality of loudspeakers 12, and a plurality of microphones 14, on a front of the housing. The camera 11, the plurality of loudspeakers 12, and the plurality of microphones 14 are placed side by side in the width direction on the front of the housing. In this example, the camera 11 is placed in a center of the front of the housing. The plurality of loudspeakers 12 are placed on a left side of the front of the housing. The plurality of microphones 14 are placed on a right side of the front of the housing.

It is to be noted that the number of loudspeakers 12, although being two in this example, may be one or more. In addition, the plurality of loudspeakers 12 are not essential in the present disclosure. In addition, in this example, the number of microphones is six. The plurality of microphones 14 function as microphones of which directivity can be changed by beamforming to be described below. When the number of microphones 14 is at least two or more, the directivity can be changed by the beamforming.

Figure 2:
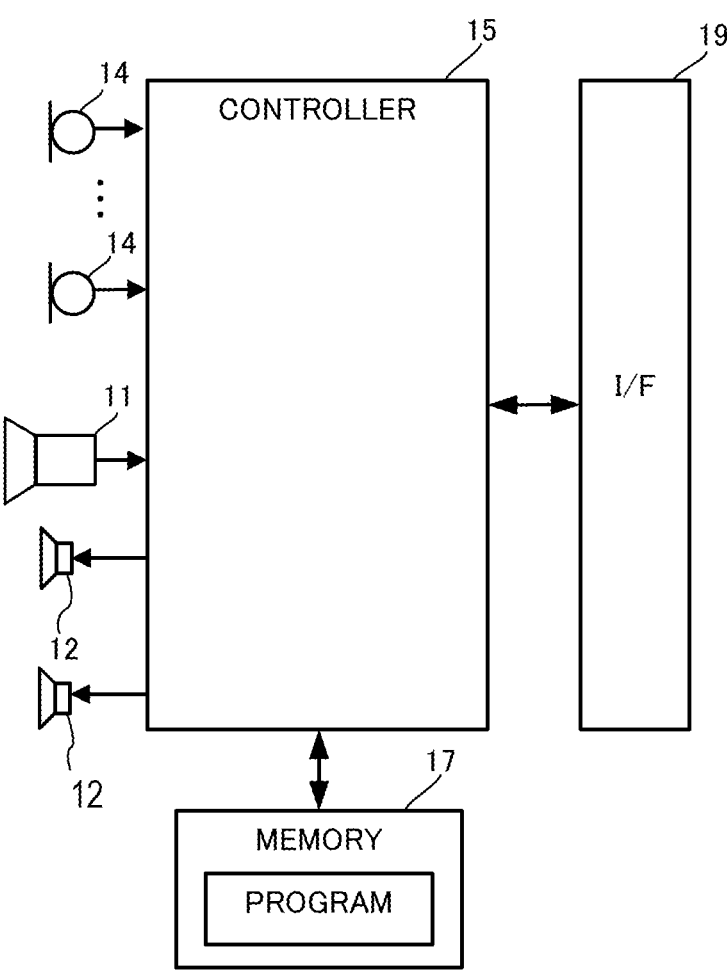
FIG. 2 is a block diagram showing a configuration of the sound collection apparatus 1.

FIG. 2 is a block diagram showing a configuration of the sound collection apparatus 1. The sound collection apparatus 1 includes the camera 11, the plurality of loudspeakers 12, the plurality of microphones 14, a hardware controller 15, a memory 17, and an interface (I/F) 19.

The memory 17 is a storage medium storing an operating program of the hardware controller 15. The hardware controller 15 includes a processor such as a CPU, which reads the operating program from the memory 17 and performs various operations. It is to be noted that the program does not have to be stored in the memory 17. For example, the program may be stored in a storage medium of an external apparatus such as a server. In such a case, the hardware controller 15 may read the program each time from the server and may execute the program.

The hardware controller 15 receives an audio signal obtained by the plurality of microphones 14. The hardware controller 15 performs the beamforming on the audio signal obtained by the plurality of microphones 14. The beamforming is processing to form a sound collection beam with directivity toward a predetermined direction by adding and combining a delay to the audio signal obtained by the plurality of microphones 14. The sound collection beam can also form directivity that focuses on a predetermined position. The hardware controller 15 forms the sound collection beam that focuses on a position of a speaker, for example. Two or more sound collection beams can also be formed simultaneously.

The hardware controller 15 outputs an audio signal according to a sound collection beam to the I/F 19. The I/F 19 is a communication I/F, for example, and sends the audio signal according to the sound collection beam to an information processing apparatus such as a PC. The information processing apparatus sends the audio signal to an external apparatus (a remote place).

The information processing apparatus such as a PC receives the audio signal from the external apparatus. The information processing apparatus sends the audio signal to the sound collection apparatus 1 through the I/F 19. The hardware controller 15 outputs the audio signal received from the information processing apparatus through the I/F 19, to the plurality of loudspeakers 12. The plurality of loudspeakers 12 emits a sound of the audio signal received from the hardware controller 15.

As a result, a user of the sound collection apparatus 1 can conduct an audio conference with a user at a remote place. In addition, the hardware controller 15 may send an image captured by the camera 11 to the external apparatus (the remote place) through the information processing apparatus such as a PC. The information processing apparatus such as a PC receives the image from the external apparatus. The information processing apparatus such as a PC displays the image on the display 3. As a result, the user of the sound collection apparatus 1 can also conduct a video conference with the user at a remote place.

Figure 3:
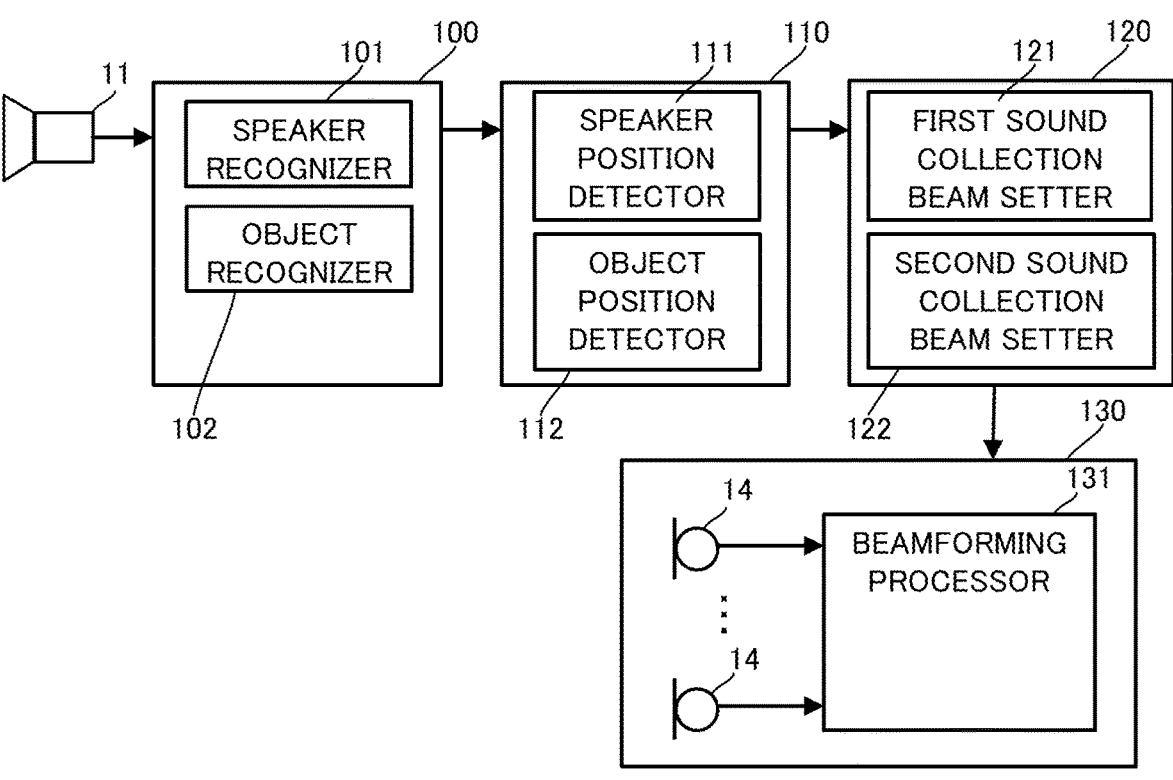
FIG. 3 is a block diagram showing a functional configuration of a hardware controller 15.

FIG. 3 is a block diagram showing a functional configuration of the hardware controller 15. The hardware controller 15 achieves the functional configuration shown in FIG. 3 by the program read from the memory 17.

Figure 4:
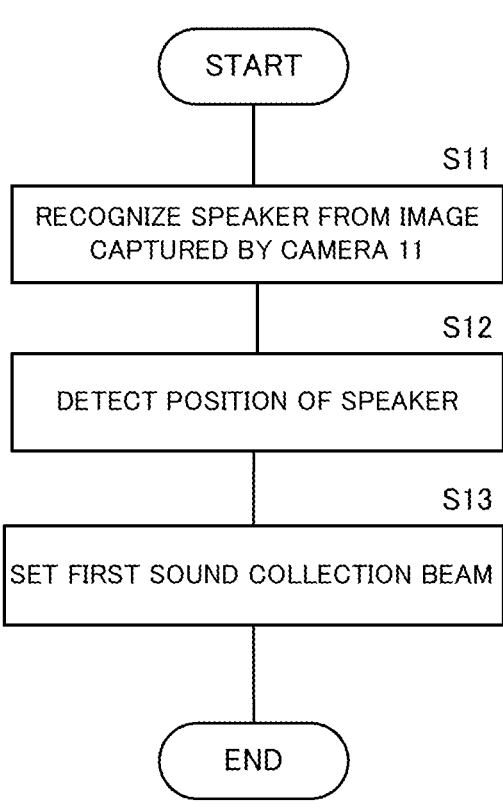
FIG. 4 is a flowchart showing an operation of a recognizer 100, a position detector 110, and a sound collection beam setter 120.

The hardware controller 15 functionally includes a recognizer 100, a position detector 110, a sound collection beam setter 120, and an array microphone 130. FIG. 4 and FIG. 5 are flowcharts showing an operation of the recognizer 100, the position detector 110, and the sound collection beam setter 120.

The recognizer 100 has a speaker recognizer 101 that recognizes a speaker, and an object recognizer 102 that recognizes an object. The speaker recognizer 101 performs processing to recognize a speaker from an image captured by the camera 11 (S11). The object recognizer 102 performs processing to recognize an object from the image captured by the camera 11.

Figure 6:
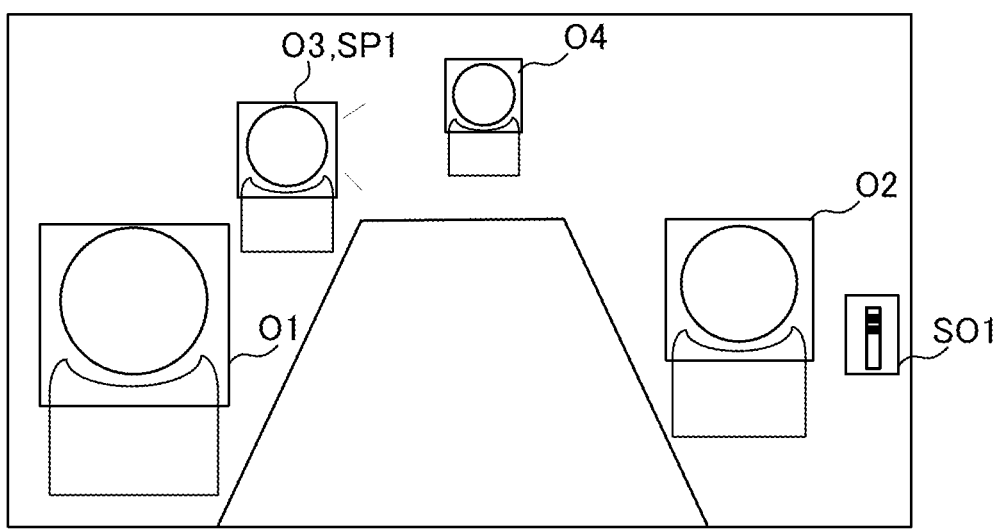
FIG. 6 is a view showing an example of an image captured by a camera 11.

FIG. 6 is a view showing an example of the image captured by the camera 11. The image captured by the camera 11 may be displayed by OSD (On-Screen Display) on the display 3, for example.

The object is a substance that is recognizable from an image and includes a person, for example. The object recognizer 102 detects a person by performing face recognition processing, for example. The face recognition processing is processing to detect a person, by applying a trained model in which a relationship between the face of the person and the image captured by the camera is trained, to a predetermined model by use of a neural network or the like, for example.

In the present embodiment, an algorithm to train a model is not limited and any machine training algorithm such as a CNN (Convolutional Neural Network) or an RNN (Recurrent Neural Network) can be used. The machine training algorithm may include supervised training, unsupervised training, semi-supervised training, reinforcement training, inverse reinforcement training, active training, or transfer training. In addition, the model may be trained by use of the machine training model such as HMNI (Hidden Markov Model) or SVM (Support Vector Machine).

In the example of FIG. 6, the object recognizer 102 detects four persons (O1 to O4).

In addition, the object recognizer 102 performs processing to recognize a specific object from the image captured by the camera 11 (S21). The specific object is an object other than a person, or a certain specific person. In this example, the specific object is an object SO1 such as a pole as shown in FIG. 6. The object recognizer 102 recognizes the specific object, based on the image of a pre-registered specific object. The processing to recognize a specific object, as with the face recognition processing, is processing to recognize a specific object by applying a trained model in which a relationship between an image of the specific object and the image captured by the camera is trained, to a predetermined model by use of a neural network or the like, for example.

It is to be noted that the specific object is not limited to the object of the pole shown in FIG. 6. The specific object may include a variety of objects such as a name badge, a remote controller, a doll, or a laser pointer, for example. In addition, the specific object may be an object including a specific image (a face image of a certain specific person, an image of a fictitious character, a two-dimensional barcode, or the like, for example) pre-registered in the memory 17. In such a case, the object recognizer 102 recognizes the specific object by recognizing the specific image.

The object recognizer 102 adds label information such as O1 to O4 to each detected person. In addition, the object recognizer 102 adds label information such as SO1 to the specific object. In this example, the object recognizer 102 adds the label information SO1 to the object of the pole.

The speaker recognizer 101 recognizes a speaker among persons O1 to O4 detected by the object recognizer 102. The speaker recognition processing, as with the face recognition processing, is processing to recognize a speaker, by applying a trained model in which a relationship between an image of the speaker and the image captured by the camera is trained, to a predetermined model by use of a neural network or the like, for example.

In the example of FIG. 6, the speaker recognizer 101 recognizes the person O3 as a speaker. The speaker recognizer 101 adds the label information (SP1, for example) of the speaker to the person O3.

The position detector 110 has a speaker position detector 111 and an object position detector 112. The speaker position detector 111 detects a position of the speaker SP1 recognized by the speaker recognizer 101 (S12). The object position detector 112 detects a position of the specific object SO1 recognized by the object recognizer 102 (S22).

The speaker position detector 111 obtains position information of the speaker SP1 in the image. The position information includes two-dimensional position information. The two-dimensional position information includes X, Y coordinates (orthogonal coordinates) with the origin at a predetermined position (the lower left, for example) of the image captured by the camera 11. In addition, the speaker position detector 111 determines a distance to the speaker SP1 based on a size of a boundary box of the speaker SP1. For example, the memory 17 prestores a table, a function, or the like that shows a relationship between a size of a human object (the bounding box of a person) and a distance. The speaker position detector 111, by comparing the size of the person stored in the memory 17 with a size (a size of the bounding box) of the speaker SP1 included in the image, obtains a distance to the speaker SP1. It is to be noted that the object position detector 112 may obtain a position of the speaker by applying a trained model in which a relationship between the speaker and the position of the speaker is trained, to a predetermined model by use of a neural network or the like, for example.

The object position detector 112 obtains position information of the specific object SO1 in the image. The position information includes two-dimensional position information. The two-dimensional position information includes X, Y coordinates (orthogonal coordinates) with the origin at a predetermined position (the lower left, for example) of the image captured by the camera 11. In addition, the object position detector 112 obtains a distance to the specific object SO1 based on a size of the bounding box of the specific object SO1. For example, the memory 17 prestores a table, a function, or the like that shows a relationship between the size of a specific object (the bounding box of a specific object) and a distance. The object position detector 112, by comparing the size of the specific object stored in the memory 17 with a size (a size of the set bounding box) of the specific object SO1 included in the image, obtains the distance to the specific object SO1. It is to be noted that the object position detector 112 may obtain the position of the specific object, by applying the trained model in which the relationship between the specific object and the position of the specific object is trained, to a predetermined model by use of a neural network or the like, for example.

The sound collection beam setter 120 has a first sound collection beam setter 121 and a second sound collection beam setter 122. The first sound collection beam setter 121 sets a first sound collection beam to the array microphone 130, based on the position of the speaker SP1 detected by the speaker position detector 111 (S13). The second sound collection beam setter 122 sets a second sound collection beam to the array microphone 130, based on the position of the specific object SO1 detected by the object position detector 112 (S23). After a conference starts, the first sound collection beam is set after any one person starts a speech. After the conference starts, the second sound collection beam is set in a case in which the sound collection apparatus 1 recognizes the specific object SO1. In a case in which no person gives a speech after the conference starts, the first sound collection beam is not set but only the second sound collection beam is set. In a case in which the sound collection apparatus 1 does not recognize the specific object SO1 and one person starts a speech, only the first sound collection beam is set. In a case in which the sound collection apparatus 1 recognizes the specific object SO1 and one person starts a speech, both the first sound collection beam and the second sound collection beam are set.

Figure 7:
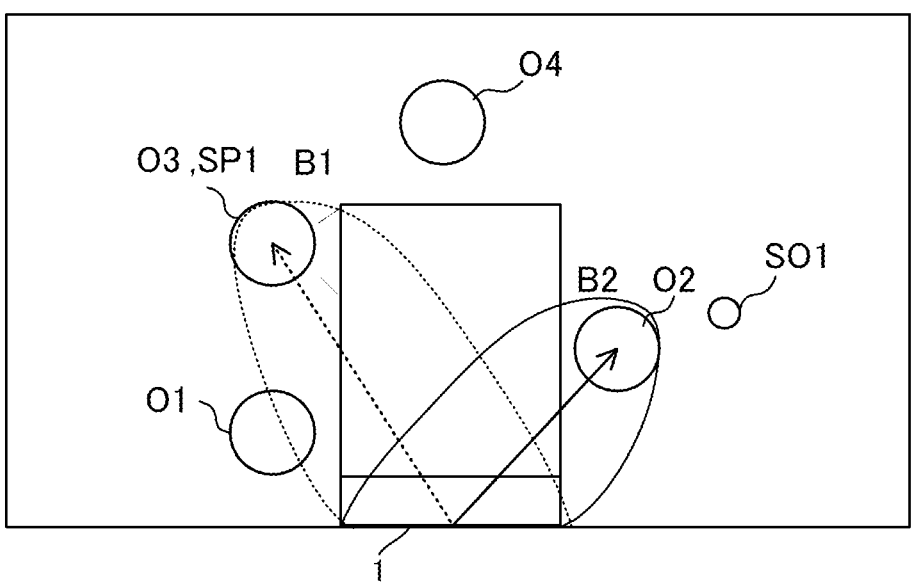
FIG. 7 is a plan view of an inside of a room corresponding to the image shown in FIG. 6.

FIG. 7 is a plan view of an inside of a room corresponding to the image shown in FIG. 6. In this example, the first sound collection beam setter 121 forms a first sound collection beam B1 that focuses on the position of the speaker SP1, to the array microphone 130.

The array microphone 130 includes the plurality of microphones 14 and a beamforming processor 131. The beamforming processor 131, based on instructions of the first sound collection beam setter 121, forms the first sound collection beam B1 that focuses on the position of the speaker SP1 by adding and combining a delay to each audio signal obtained by the plurality of microphones 14. As a result, the array microphone 130 can obtain speech voice of the speaker SP1 at a high SN ratio.

The second sound collection beam setter 122 forms a second sound collection beam B2 that focuses on a position of the person O2 nearest to the specific object SO1, to the array microphone 130. The beamforming processor 131, based on instructions of the second sound collection beam setter 122, forms the second sound collection beam B2 that focuses on the position of the person O2 by adding and combining a delay to each audio signal obtained by the plurality of microphones 14. As a result, the array microphone 130 can obtain voice of the person O2 at a high SN ratio. It is to be noted that the second sound collection beam setter 122 may form the second sound collection beam B2 that focuses on the position of the specific object SO1, to the array microphone 130. In this case as well, the voice of the person O2 nearest to the specific object SO1 can be obtained at a high SN ratio. For example, in a case in which the specific object SO1 is a specific person, the second sound collection beam setter 122 forms the second sound collection beam B2 that focuses on the position of the specific object SO1, to the array microphone 130.

The direction of the first sound collection beam B1 changes according to a change in the speaker. For example, when a speech of the person O3 stops and the person O1 starts a speech, the first sound collection beam B1 is directed in the direction of the person O1. That is to say, the first sound collection beam B1 is a dynamic beam that changes according to the position of the speaker.

In contrast, the second sound collection beam B2 does not change according to the position of the speaker, and, as with a fixed beam, is a sound collection beam that keeps directed in the direction of a specific person or a person nearest to the specific object SO1. Hereinafter, such a second sound collection beam is referred to as a semi-fixed beam.

A user may desire to set to keep a sound collection beam pointed at a position of a specific person in order to reliably deliver voice of an important speaker (an executive, for example) to an opposite communication party. The sound collection apparatus 1 according to the present embodiment can easily set to keep a sound collection beam pointed at a specific person, as with the fixed beam, by placing the specific object SO1 near the specific person, without requiring any setting of a device or the like at all in advance. That is to say, the user of the sound collection apparatus 1, by simply placing the specific object such as a pole near the specific person, can obtain customer experience to easily perform setting to keep a sound collection beam pointed at the specific person while using the dynamic beam directed to the position of the speaker.

Figure 8:
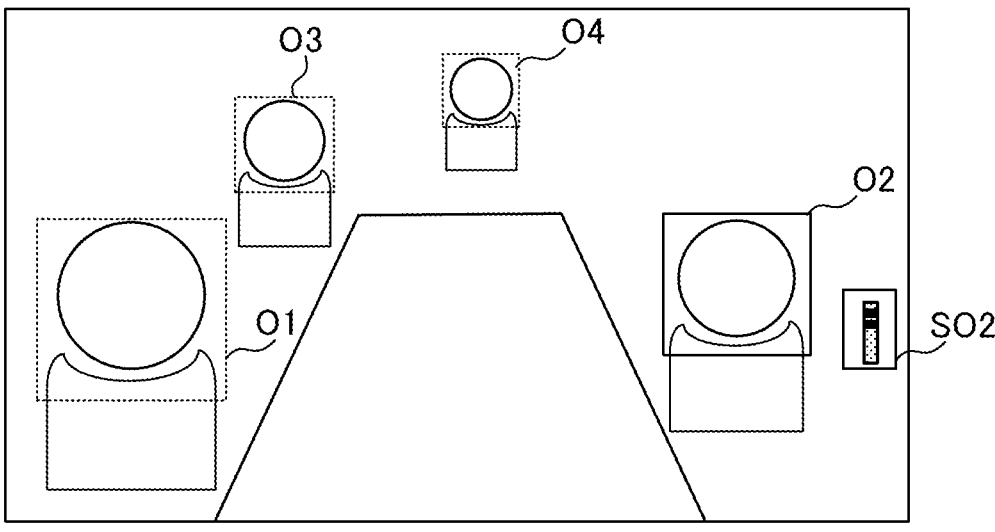
FIG. 8 is a view showing an example of an image captured by the camera 11, according to Modification 1.
Figure 9:
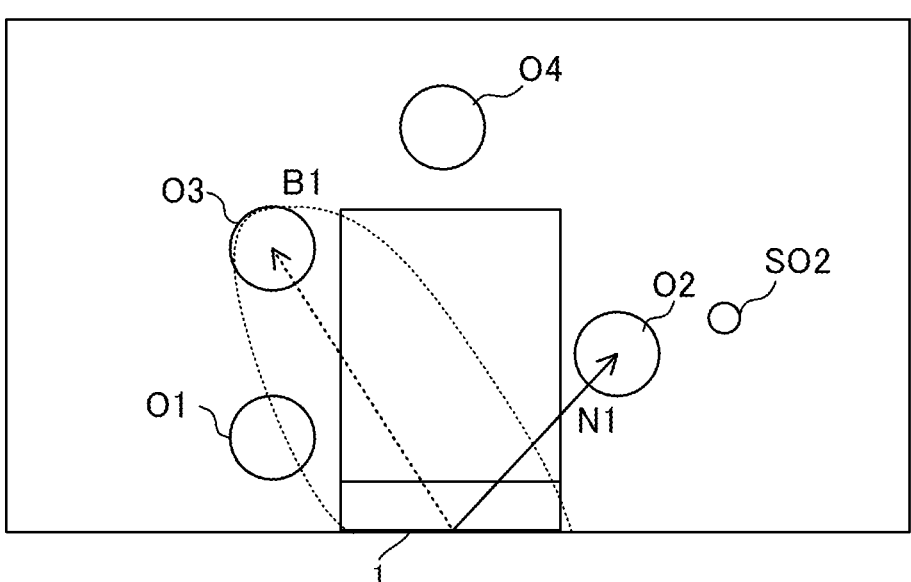
FIG. 9 is a plan view of an inside of a room corresponding to the image shown in FIG. 8.

Next, FIG. 8 is a view showing an example of an image captured by the camera 11, according to Modification 1. FIG. 9 is a plan view of an inside of a room corresponding to the image shown in FIG. 8. The same reference numerals are used to refer to components common to FIG. 6 and FIG. 7, and the description will be omitted.

In this example as well, the first sound collection beam setter 121 forms the first sound collection beam B1 that focuses on the position of the speaker SP1, to the array microphone 130.

On the other hand, an object recognizer 102 according to Modification 1 recognizes a specific object SO2. In this example, the specific object SO2 has a different color from the specific object SO1.

The object position detector 112 detects a position of the specific object SO2. The second sound collection beam setter 122 performs setting to point a non-sound collection beam (so-called null) having a lower sensitivity than other directions at the position (or the position of the specific object 502) of the person O2 nearest to the specific object SO2, to the array microphone 130.

The beamforming processor 131, based on instructions of the second sound collection beam setter 122, forms a non-sound collection beam Ni to have the lowest sensitivity at the position (or the position of the specific object SO2) of the person O2 by adding and combining a delay to each audio signal obtained by the plurality of microphones 14. As a result, the array microphone 130 ceases to obtain the voice of the person O2.

In this manner, the setting the second sound collection beam includes setting a non-sound collection beam having a lower sensitivity than other directions based on the position of the specific object. For example, in a case in which the person O2 is an observer who is not scheduled to give a speech in a conference, the user of a sound collection apparatus 1 according to Modification 1, by simply placing the specific object such as a pole near the specific person O2, can easily perform setting not to obtain the voice of the person O2 while using the dynamic beam directed to the position of the speaker.

It is to be noted that the specific object to set the non-sound collection beam is not limited to an object of a different color. The hardware controller 15 may pre-register the appearance of the specific object to set the non-sound collection beam in the memory 17.

Figure 10:
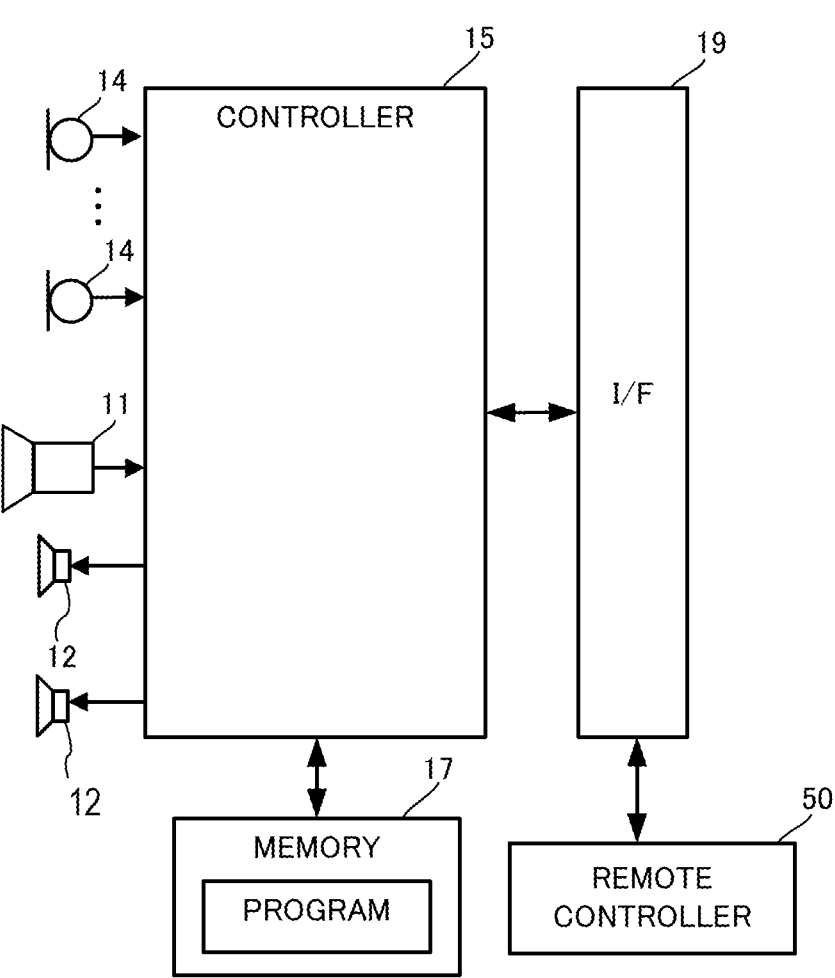
FIG. 10 is a block diagram showing a configuration of a sound collection apparatus 1 according to Modification 2.

Next, FIG. 10 is a block diagram showing a configuration of a sound collection apparatus 1, according to Modification 2. The sound collection apparatus 1 according to Modification 2 further includes a remote controller 50. The remote controller 50 is a terminal to receive an operation from a user. The remote controller 50 is connected to the I/F 19 by means of communication such as a USB or Bluetooth (registered trademark). The remote controller 50 has a plurality of keys, for example. The plurality of keys have a power on/off key, a volume key, a direction key, or a mute key. A user operates the direction key, for example, and performs an operation to change a capture direction of the camera 11. The remote controller 50 sends an operation signal according to the operation, to the hardware controller 15 through the I/F 19.

The mute key is a physical controller to receive a mute operation from a user. When the user operates the mute key, the remote controller 50 sends the operation signal according to an operation of the mute key, to the hardware controller 15 through the I/F 19. The hardware controller 15, in a case of receiving the operation signal of the mute key, mutes the first sound collection beam (the dynamic beam) or the second sound collection beam (the semi-fixed beam). The hardware controller 15 does not output an audio signal according to a muted sound collection beam, to the I/F 19.

The mute key may have an all mute key, a dynamic beam mute key, and a semi-fixed beam mute key. The hardware controller 15, in a case of receiving the operation signal of the all mute key, mutes all the dynamic beams and semi-fixed beams. The hardware controller 15, in a case of receiving the operation signal of the dynamic beam mute key, mutes all the dynamic beams. The hardware controller

15, in a case of receiving the operation signal of the semi-fixed beam mute key, mutes all the semi-fixed beams.

As a result, the user of the sound collection apparatus 1 can easily set not to allow an opposite communication party to hear only voice of a specific person or not to allow an opposite communication party to hear voice of all members, or so on.

It is to be noted that the specific object may have a mute key. In such a case, the specific object may be connected to the sound collection apparatus 1 by means of communication such as a USB or Bluetooth (registered trademark). The specific object sends the operation signal according to the operation of the mute key, to the sound collection apparatus 1. Alternatively, the specific object, in a case of receiving the operation of the mute key, may emit a specific sound. The sound collection apparatus 1, in a case of recognizing the specific sound emitted by the specific object, receives the mute operation. The specific sound may be a specific pulse sound, an alarm sound, white noise, or the like, for example. The specific sound may be a sound in a non-audible range (20 kHz or more, for example). In addition, the specific sound may be a spread code (pseudo noise). In such a case, the sound collection apparatus 1 obtains a correlation value between a predetermined spread code and the audio signal obtained by the microphone 14. The sound collection apparatus 1 receives the mute operation, in a case in which the correlation value exceeds a predetermined level.

Figure 11:
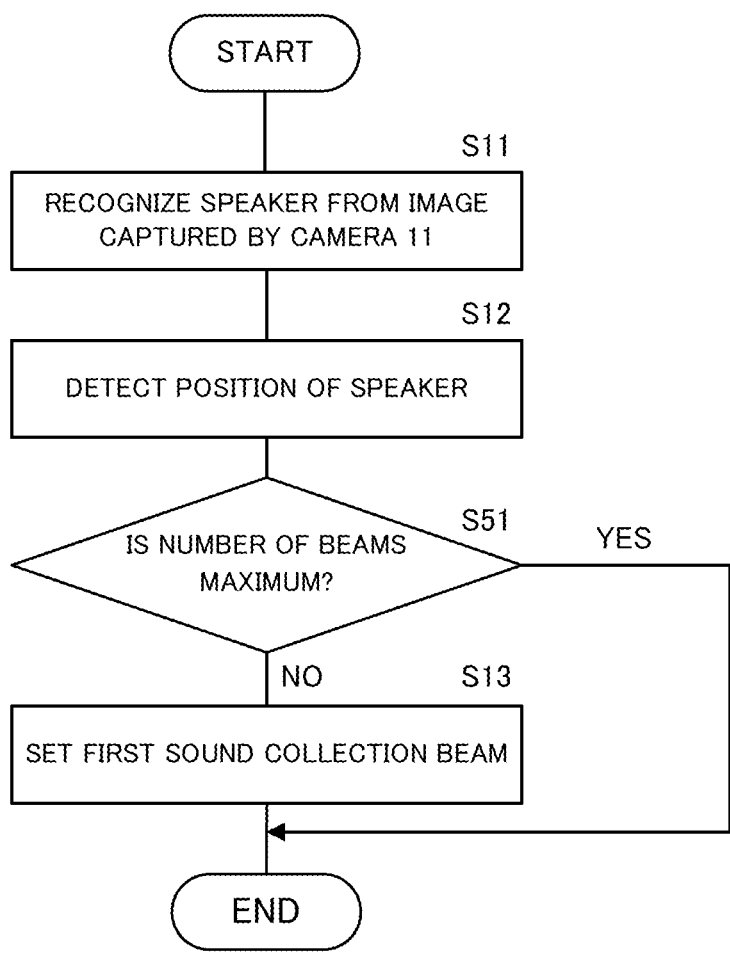
FIG. 11 is a flowchart showing an operation of a hardware controller 15 according to Modification 3.

FIG. 11 is a flowchart showing an operation of a hardware controller 15 according to Modification 3. The same reference numerals are used to refer to operations common to FIG. 5, and the description will be omitted.

The first sound collection beam setter 121, after detecting the speaker SP1 by the speaker position detector 111 (after S12), determines whether or not the number of current sound collection beams is the maximum (S51).

As described above, the sound collection beam can be simultaneously set in a plurality of directions. However, processing power limits the number of simultaneously settable sound collection beams. The sound collection apparatus 1 can simultaneously use the dynamic beam only by a difference between the number of settable maximum sound collection beams and the number of set semi-fixed beams. In other words, the sound collection apparatus 1 can simultaneously use the semi-fixed beam only by a difference between the number of settable maximum sound collection beams and the number of set dynamic beams.

A sound collection apparatus 1 according to Modification 3 can simultaneously set four sound collection beams, for example. Therefore, the hardware controller 15 according to Modification 3 first determines whether or not the number of current sound collection beams reaches four. The hardware controller 15, in a case of determining that the number of current sound collection beams is three or less (NO in S51), sets a new first sound collection beam to the array microphone 130, based on the position of a detected speaker SP1 (S13). On the other hand, the hardware controller 15, in a case of determining that the number of current sound collection beams is four (YES in S51), does not set a new first sound collection beam.

The sound collection apparatus 1 according to Modification 3 does not cancel the dynamic beam and semi-fixed beam that have been set in the past, and thus can continue to obtain voice of a person who has already given a speech and voice of a specific person till the end of a conference.

Figure 12:
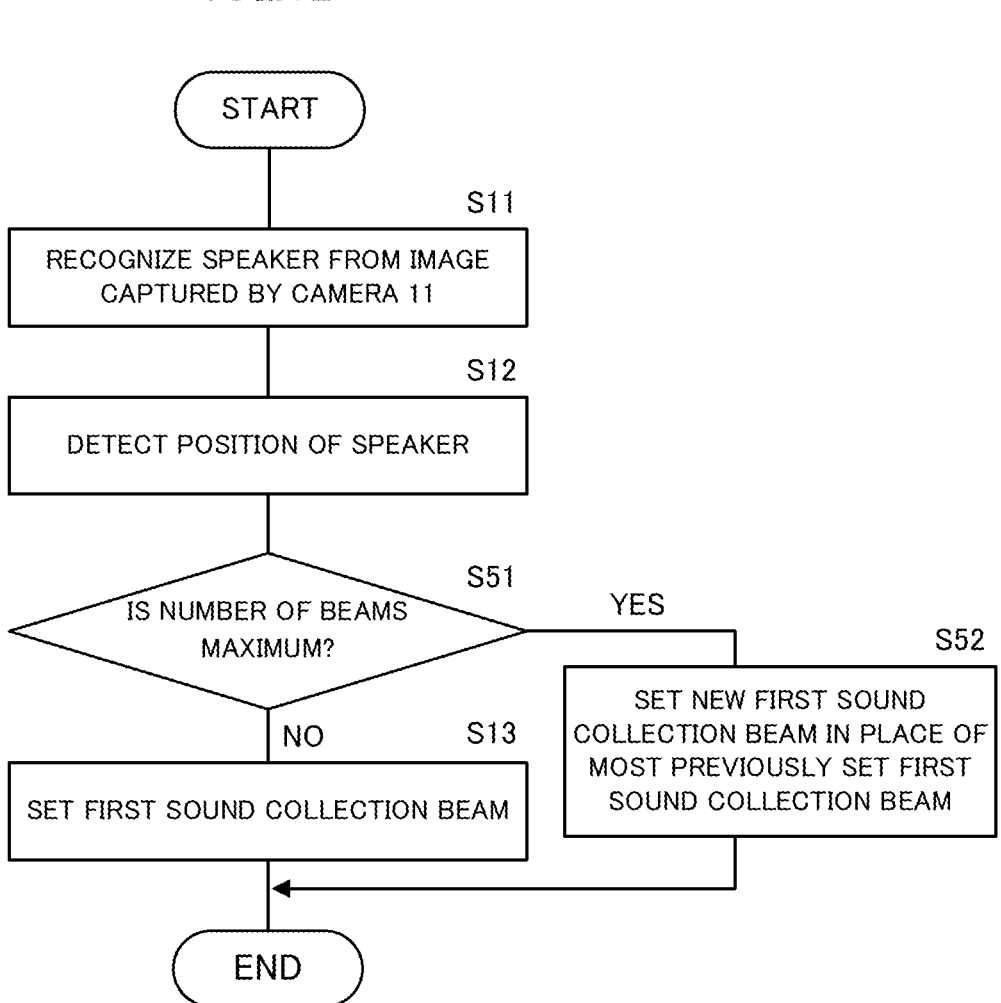
FIG. 12 is a flowchart showing an operation of a hardware controller 15 according to Modification 4.

FIG. 12 is a flowchart showing an operation of a hardware controller 15 according to Modification 4. The same reference numerals are used to refer to operations common to FIG. 11, and the description will be omitted.

The hardware controller 15 according to Modification 4, in the case of determining that the number of current sound collection beams is four (YES in S51), sets a new first sound collection beam in place of a most previously set first sound collection beam (S52).

The sound collection apparatus 1 according to Modification 4 cancels a most previously set dynamic beam, and thus can obtain the voice of a person who has newly given a speech when an agenda changes, for example.

Figure 13:
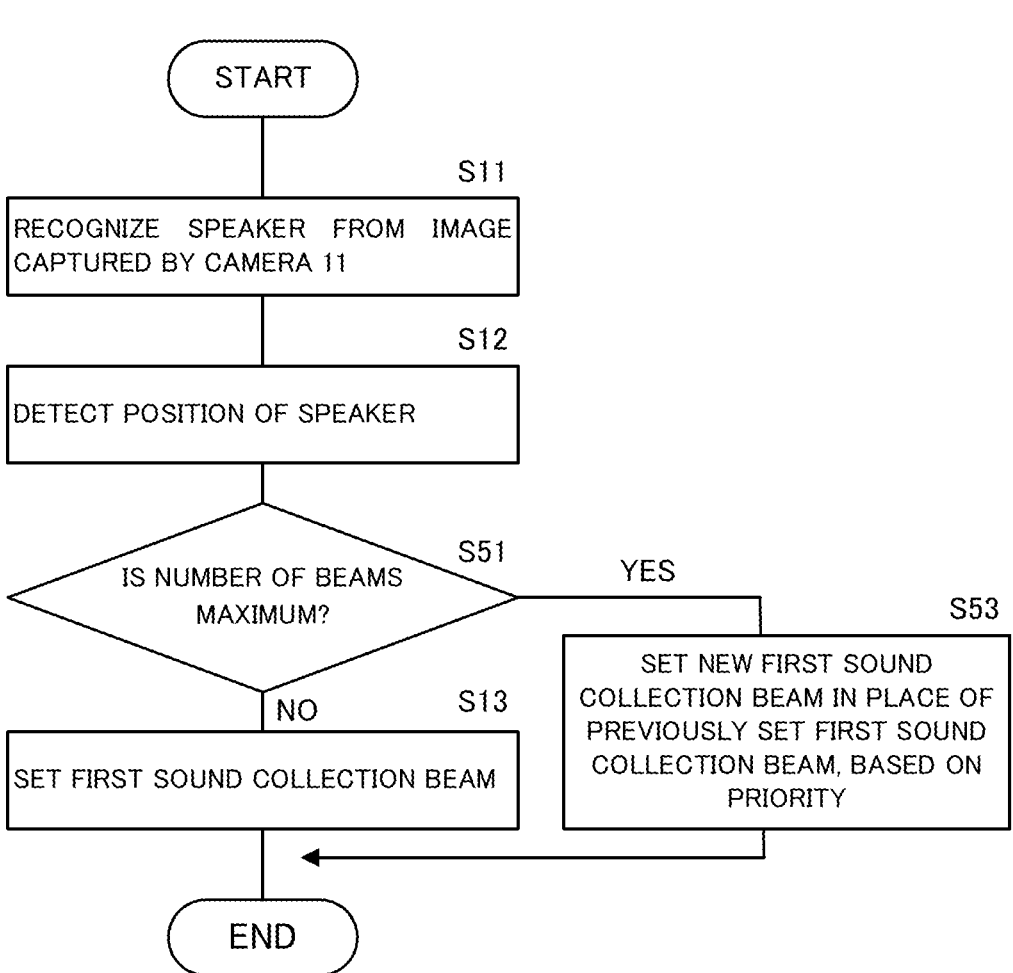
FIG. 13 is a flowchart showing an operation of a hardware controller 15 according to Modification 5.

FIG. 13 is a flowchart showing an operation of a hardware controller 15 according to Modification 5. The same reference numerals are used to refer to operations common to FIG. 11, and the description will be omitted.

The hardware controller 15 according to Modification 5, in the case of determining that the number of current sound collection beams is four (YES in S51), sets a new first sound collection beam in place of the first sound collection beam that has been set based on priority (S53).

The priority is received from a user with the remote controller 50 shown in Modification 2, for example. A user sets high priority or low priority to each of a plurality of speakers recognized in the past. The hardware controller 15 sets a new first sound collection beam in place of the first sound collection beam that has been set to low priority or the first sound collection beam to which no priority is set.

The sound collection apparatus 1 according to Modification 5 can continue to obtain voice of a speaker selected by the user till the end of a conference.

Figure 14:
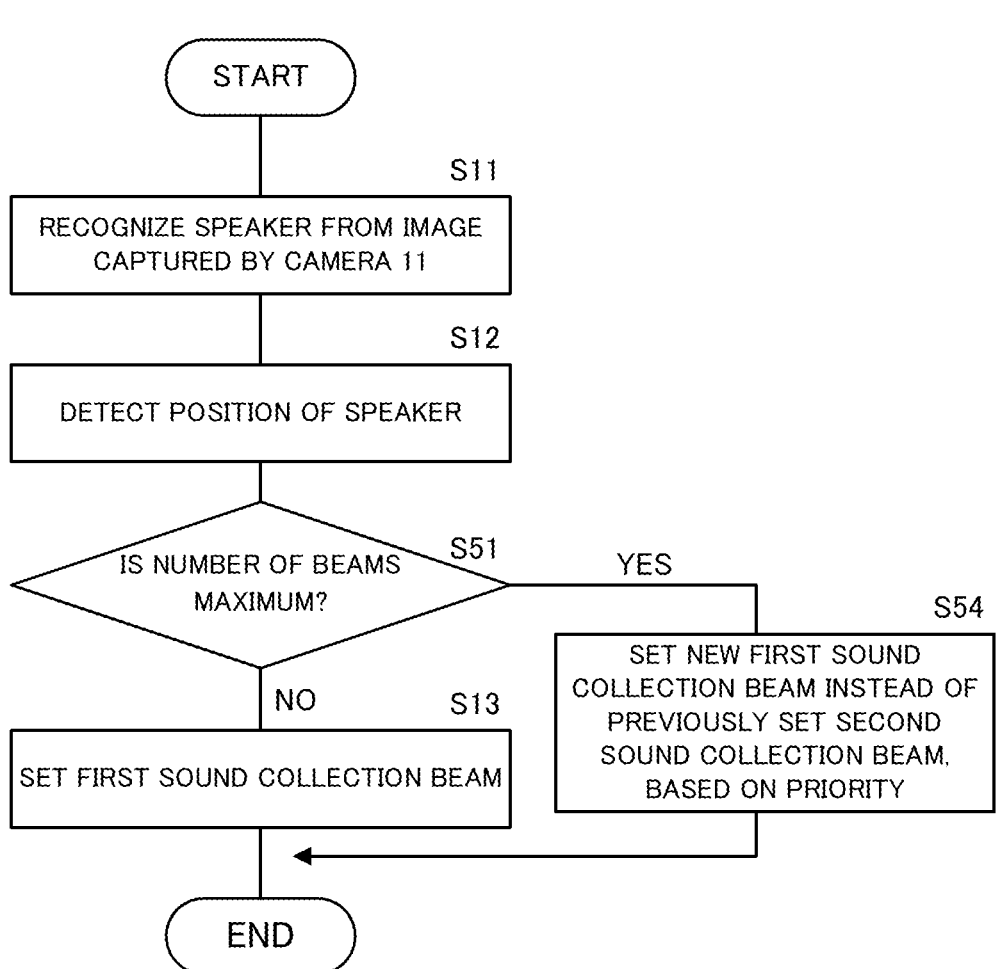
FIG. 14 is a flowchart showing an operation of a hardware controller 15 according to Modification 6.

FIG. 14 is a flowchart showing an operation of a hardware controller 15 according to Modification 6. The same reference numerals are used to refer to operations common to FIG. 11, and the description will be omitted.

The hardware controller 15 according to Modification 6, in the case of determining that the number of current sound collection beams is four (YES in S51), sets a new first sound collection beam in place of the second sound collection beam that has been set based on priority (S54).

The sound collection apparatus 1 according to Modification 6 can also continue to obtain the voice of the speaker selected by the user till the end of a conference.

Figure 15:
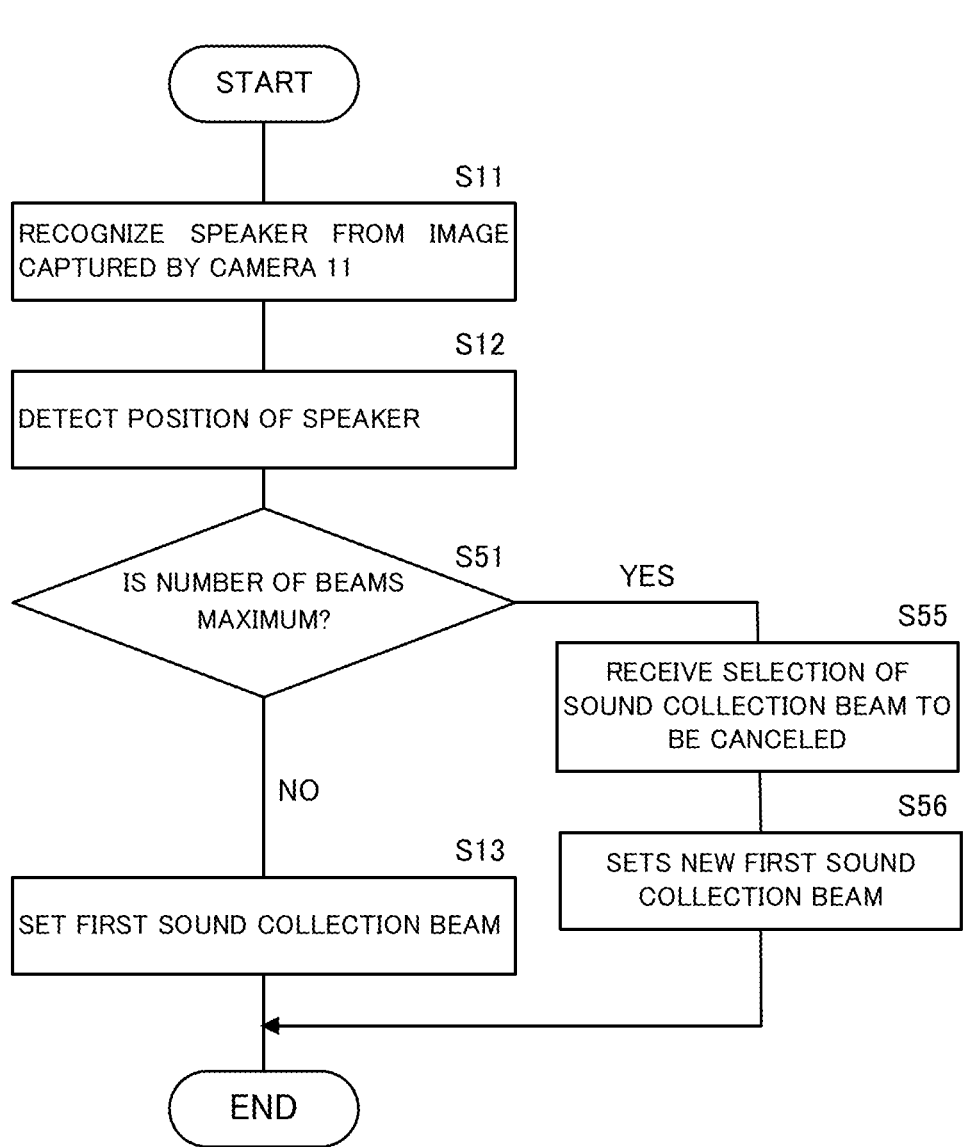
FIG. 15 is a flowchart showing an operation of a hardware controller 15 according to Modification 7.

FIG. 15 is a flowchart showing an operation of a hardware controller 15 according to Modification 7. The same reference numerals are used to refer to operations common to FIG. 11, and the description will be omitted.

The hardware controller 15 according to Modification 7, in the case of determining that the number of current sound collection beams is four (YES in S51), receives a selection of the sound collection beam to be canceled, from a user (S55), and sets a new first sound collection beam in place of the first sound collection beam or the second sound collection beam that is selected by the user (S56).

The sound collection apparatus 1 according to Modification 7 is also able to continue to obtain the voice of the speaker selected by the user till the end of a conference.

Figure 16:
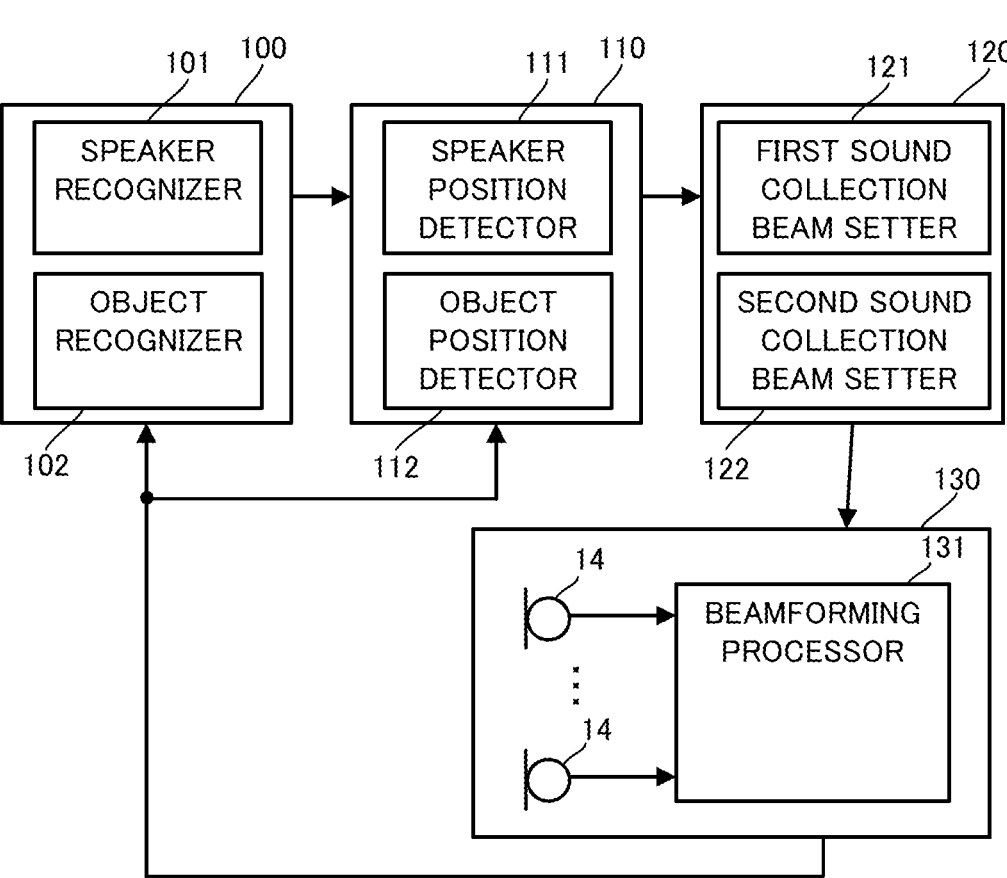
FIG. 16 is a block diagram showing a functional configuration of a hardware controller 15 according to Modification 8.

FIG. 16 is a block diagram showing a functional configuration of a hardware controller 15 according to Modification 8. The speaker recognizer 101 and the object recognizer 102 recognize a speaker and an object, based on the audio signal obtained by each of the plurality of microphones 14 in the array microphone 130.

The speaker recognizer 101 detects a speaker by performing voice recognition processing, for example. The voice recognition processing is processing to detect presence or absence of voice, by applying a trained model in which a relationship between the voice and the audio signal obtained by the microphone 14 is trained, to a predetermined model by use of a neural network or the like, for example.

The object recognizer 102 recognizes the voice of a specific person by the voice recognition processing. However, the object recognizer 102 detects the voice of a specific person by use of a trained model in which a relationship between voice of a pre-registered specific person and the audio signal obtained by the microphone 14 is trained.

Alternatively, the object recognizer 102 recognizes a specific sound that the specific object emits. The specific sound may be a specific pulse sound, an alarm sound, white noise, or the like, for example. The specific sound may be a sound in a non-audible range (20 kHz or more, for example). In addition, the specific sound may be a spread code (pseudo noise). In such a case, the object recognizer 102 obtains a correlation value between a predetermined spread code and the audio signal obtained by the microphone 14. The object recognizer 102 recognizes the specific object, in the case in which the correlation value exceeds a predetermined level.

The speaker position detector 111 and the object position detector 112 detect a position of a speaker and an object, based on the audio signal obtained by each of the plurality of microphones 14 in the array microphone 130.

The speaker position detector 111 determines the correlation value of the audio signal of the plurality of microphones 14, for example, determines a difference (a phase difference) in timing to obtain voice, and thus detects the position of a speaker. The speaker position detector 111 can uniquely determine the position of a speaker by determining the difference in timing to obtain voice in the three or more microphones 14.

The object position detector 112 can also uniquely determine the position of a specific person or a specific object by determining the difference in timing to obtain sound in the three or more microphones 14.

In this manner, the position of a speaker and an object can also be determined based on a sound.

Figure 17:
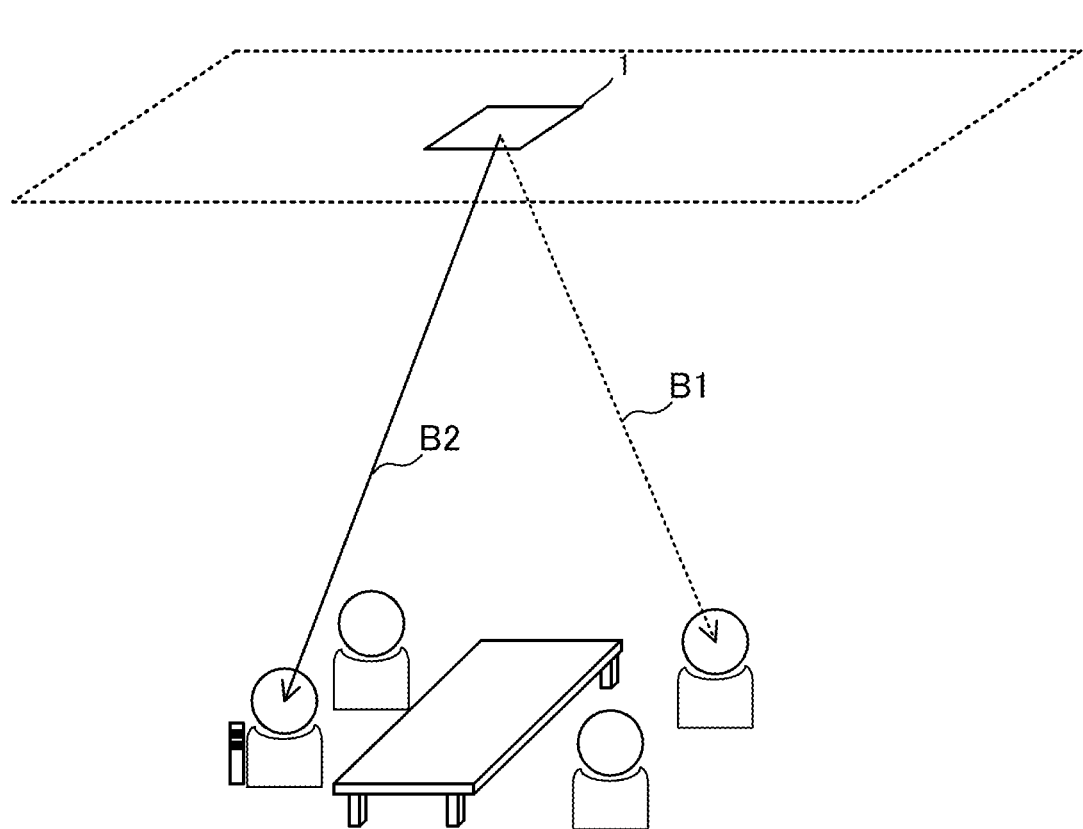
FIG. 17 is an external perspective view showing the sound collection apparatus 1 placed on a ceiling.

It is to be noted that, as shown in FIG. 17, the sound collection apparatus 1 may be placed on a ceiling, for example.

In addition, audio conferencing with a remote place by use of a loudspeaker is not essential in the present disclosure. For example, the sound collection apparatus 1 may be a video camera. In this case as well, the user of the sound collection apparatus 1 can easily set a range from which the voice is desired to obtain and recognize the range.

The description of the foregoing embodiments is illustrative in all points and should not be construed to limit the present disclosure. The scope of the present disclosure is defined not by the foregoing embodiments but by the following claims. Further, the scope of the present disclosure is intended to include all modifications within the scopes of the claims and within the meanings and scopes of equivalents.

What is claimed is:

1. A sound collection control method comprising:
recognizing a speaker from an image;
detecting a position of the recognized speaker;
setting a first collection beam based on the detected position of the recognized speaker;
recognizing a specific object that is not a person and that does not generate sound-from the image;
detecting a position of the recognized specific object; and
setting a second collection beam based on the detected position of the recognized specific object,
wherein the first collection beam is a sound collection beam, and wherein, in a case where no person speaks, only the second collection beam is set without setting the first sound collection beam.

2. The sound collection control method according to claim 1, wherein the second collection beam includes a non-sound collection beam having a lower sensitivity than other directions.

3. The sound collection control method according to claim 1, wherein:

the recognizing of the speaker recognizes a plurality of speakers, including the speaker, from the image, the detecting of the position of the recognized speaker detects a plurality of positions of the recognized plurality of speakers, including the position of the recognized speaker, the setting of the first collection beam sets a plurality of first collection beams, including the first collection beam, based on the detected plurality of positions of the recognized plurality of speakers, the recognizing of the specific object recognizes a plurality of specific objects, including the specific object, from the image, the detecting of the position of the recognized specific object detects a plurality of positions of the recognized plurality of specific objects, including the position of the recognized specific object, the setting of the second collection beam sets a plurality of second collection beams, including the second collection beam, based on the detected plurality of positions of the recognized plurality of specific objects, and a total number of the first collection beams and the second collection beams has a maximum.

4. The sound collection control method according to claim 3, wherein, in a state where the total number exceeds the maximum, the setting of the first collection beam does not set a newest first collection beam or sets the newest first collection beam in place of a previously set first collection beam.

5. The sound collection control method according to claim 3, wherein, in a state where the total number exceeds the maximum, the setting of the first collection beam sets a newest first collection beam in place of a previously set first or second collection beam, which is selectable by a user.

6. The sound collection control method according to claim 1, further comprising:

receiving a mute operation on the first collection beam or the second collection beam; and muting the first collection beam or the second collection beam that receives the mute operation.

7. A sound collection control method comprising:

recognizing a speaker from an image;

detecting a position of the recognized speaker;

setting a first collection beam based on the detected position of the recognized speaker;

recognizing a specific object other than the recognized speaker from the image;

detecting a position of the recognized specific object; and setting a second collection beam based on the detected position of the recognized specific object, wherein:

the first collection beam is a sound collection beam;

the recognizing of the speaker recognizes a plurality of speakers, including the speaker, from the image;

the detecting of the position of the recognized speaker detects a plurality of positions of the recognized plurality of speakers, including the position of the recognized speaker;

the setting of the first collection beam sets a plurality of first collection beams, including the first collection beam, based on the detected plurality of positions of the recognized plurality of speakers;

the recognizing of the specific object recognizes a plurality of specific objects, including the specific object, from the image;

the detecting of the position of the recognized specific object detects a plurality of positions of the recognized plurality of specific objects, including the position of the recognized specific object;

the setting of the second collection beam sets a plurality of second collection beams, including the second collection beam, based on the detected plurality of positions of the recognized plurality of specific objects;

a total number of the first collection beams and the second collection beams has a maximum; and in a state where the total number exceeds the maximum, the setting of the first collection beam sets a newest first collection beam in place of a previously set first or second collection beam based on predefined priority.

8. A sound collection apparatus comprising:

an array microphone; and a hardware controller configured to execute a plurality of tasks, including:

a speaker recognizing task that recognizes a speaker from an image;

a speaker position detecting task that detects a position of the recognized speaker;

a first collection beam setting task that sets a first collection beam to the array microphone based on the detected position of the speaker;

an object recognizing task that recognizes a specific object that is not a person and that does not generate sound from the image;

an object position detecting task that detects a position of the recognized specific object; and a second collection beam setting task that sets a second collection beam to the array microphone based on the detected position of the recognized specific object, wherein the first collection beam is a sound collection beam, and wherein, in a case where no person speaks, only the second collection beam is set without setting the first sound collection beam.

9. The sound collection apparatus according to claim 8, wherein the second collection beam includes a non-sound collection beam having a lower sensitivity than other directions.

10. The sound collection apparatus according to claim 8, wherein:

the speaker recognizing task recognizes a plurality of speakers, including the speaker, from the image, the speaker position detecting task detects a plurality of positions of the recognized plurality of speakers, including the position of the recognized speaker, the first collection beam setting task sets a plurality of first collection beams, including the first collection beam, based on the detected plurality of positions of the recognized plurality of speakers, the object recognizing task recognizes a plurality of specific objects, including the specific object, from the image, the object position detecting task detects a plurality of positions of the recognized plurality of specific objects, including the position of the recognized specific object, the second collection beam setting task sets a plurality of second collection beams, including the second collection beam, based on the detected plurality of positions of the recognized plurality of specific objects, and a total number of the first collection beams and the second collection beams has a maximum.

11. The sound collection apparatus according to claim 10, wherein, in a state where the total number exceeds the maximum, the first collection beam setting task does not set a newest first collection beam or sets the newest first collection beam in place of a previously set first collection beam.

12. The sound collection apparatus according to claim 10, wherein, in a state where the total number exceeds the maximum, the first collection beam setting task sets a newest first collection beam in place of a previously set first or second collection beam, which is selectable by a user.

13. The sound collection apparatus according to claim 8, further comprising a mute controller that:

receives a mute operation on the first collection beam or the second collection beam; and mutes the first collection beam or the second collection beam that receives the mute operation.

14. A sound collection apparatus comprising:

an array microphone; and a hardware controller configured to execute a plurality of tasks, including:

a speaker recognizing task that recognizes a speaker from an image;

a speaker position detecting task that detects a position of the recognized speaker;

a first collection beam setting task that sets a first collection beam to the array microphone based on the detected position of the speaker;

an object recognizing task that recognizes a specific object other than the speaker from the image;

an object position detecting task that detects a position of the recognized specific object; and a second collection beam setting task that sets a second collection beam to the array microphone based on the detected position of the recognized specific object, wherein:

the first collection beam is a sound collection beam;

the speaker recognizing task recognizes a plurality of speakers, including the speaker, from the image;

the speaker position detecting task detects a plurality of positions of the recognized plurality of speakers, including the position of the recognized speaker;

the first collection beam setting task sets a plurality of first collection beams, including the first collection beam, based on the detected plurality of positions of the recognized plurality of speakers;

the object recognizing task recognizes a plurality of specific objects, including the specific object, from the image;

the object position detecting task detects a plurality of positions of the recognized plurality of specific objects, including the position of the recognized specific object;

the second collection beam setting task sets a plurality of second collection beams, including the second collection beam, based on the detected plurality of positions of the recognized plurality of specific objects;

a total number of the first collection beams and the second collection beams has a maximum; and in a state where the total number exceeds the maximum, the first beam setting task sets a newest first collection beam in place of a previously set first or second collection beam based on predefined priority.

*    *    *    *    *